United States Patent Office 3,639,451
Patented Feb. 1, 1972

3,639,451
PROCESS FOR ESTERIFYING AROMATIC
CARBOXYLIC ACIDS
David A. Ebert, Cheektowaga, N.Y., assignor to Allied
Chemical Corporation, New York, N.Y.
No Drawing. Filed Mar. 25, 1968, Ser. No. 715,550
Int. Cl. C07c 69/78, 69/82
U.S. Cl. 260—475 R                           10 Claims

ABSTRACT OF THE DISCLOSURE

This specification discloses a novel process for esterifying aromatic carboxylic acids whereby the carboxylic acid is heated with a mixture containing at least a stoichiometric amount of a saturated orthoester of an aliphatic alcohol having from 1 to 8 carbon atoms and a stoichiometric excess of a lower saturated alcohol in the presence of a strong acid catalyst. This process improves the rate of esterification and eliminates colored by-products. The process is particularly suitable for the esterification of partially esterified alkyl terephthalates to dialkyl terephthalates of high purity, as evidenced by a lack of colored by-products.

---

Esters of aromatic carboxylic acids and saturated aliphatic alcohols of 1 to 8 carbon atoms are important commercial products widely used as plasticizers, solvents, and as intermediates for the manufacture of perfumes and synthetic polyesters, particularly fiber-forming polyesters such as polyethylene terephthalate. For many of these applications esters of high purity, as evidenced by absence of colored by-products, are essential.

These esters are conventionally prepared by reacting an aromatic carboxylic acid with at least a stoichiometric amount of the alcohol in the presence of a strong acid catalyst. However, in many cases esterification is slow and does not go to completion, and impure products are obtained containing colored by-products which are difficult to remove, thereby greatly increasing the cost of preparing these valuable esters.

Various methods have been proposed in the prior art to overcome these disadvantages. H. Cohen et al. in Chemistry and Industry, 43, 349 (1965) have disclosed the esterification of various aromatic carboxylic acids with triethylorthoformate, in the absence of solvent or sulfonic acid catalysts. However, high temperatures, e.g. about 145–190° C., are required for this process, and substantial quantities of colored by-products are formed requiring tedious and expensive purification procedures.

J. H. Brown et al., in U.S. Pat. 2,978,469, issued Apr. 4, 1961, disclose an esterification process whereby a carboxylic acid is reacted in the presence of a dialkyl ketal in the presence of a catalytic amount of water or alcohol and an acid esterification catalyst. However, highly colored impurities contaminate the ester product and must be removed.

It is an object of the present invention to provide an improved process for the preparation of lower alkyl esters of aromatic carboxylic acids.

It is another object to provide a process for esterifying aromatic carboxylic acids without forming colored by-products.

It is a further object to provide a process for esterifying aromatic carboxylic acids at an improved rate.

Further objects will become apparent from the following detailed description thereof.

We have found that aromatic carboxylic acids can be esterified to high yields of esters at excellent rates without forming colored by-products by reacting an aromatic carboxylic acid in the presence of a mixture of at least a stoichiometric amount of an orthoester, and a stoichiometric excess of a lower saturated alkanol in the presence of a strong acid catalyst.

Esterification according to this process proceeds at an improved rate over acid-catalyzed esterification using an alcohol alone or an orthoester alone, and the ester obtained is essentially free of colored by-products. The resultant esters, therefore, are of sufficiently high purity so that further purification is not required for most applications.

The aromatic carboxylic acids suitable for use in the invention include mono- and polycarboxylic acids of the benzene and naphthalene series. The aromatic nucleus of the acid can be substituted further with one or more groups which are unreactive with orthoesters such as alkyl, alkoxy, carbalkoxy, nitro and halogen, as well as with nitrogen-free groups which are reactive with orthoesters such as formyl and other oxocarbonyl radicals.

In particular the substituents preferred contain alkyl groups of 1 to 17 carbon atoms. Representative of such carboxylic acids are benzoic acid, o-, m- and p-toluic acid, 3-ethylbenzoic acid, 2-pentylbenzoic acid, 2-decylbenzoic acid, 2-hexadecylbenzoic acid, 2-, 3- and 4-methoxybenzoic acid, 4-nonyloxybenzoic acid, 4-undecylbenzoic acid, o-, m- and p-nitrobenzoic acid, 3,5-dimethylbenzoic acid, 3,5-dinitrobenzoic acid, 2,4,6-trimethylbenzoic acid, 3,4,5-trimethylbenzoic acid, 2-, 3- and 4-chlorobenzoic acid, 2-, 3- and 4-bromobenzoic acid, 1- and 2-naphthalene carboxylic acid, 4-carboxybenzaldehyde, phthalic acid, isophthalic acid, terephthalic acid, o-chlorophthalic acid, o-bromophthalic acid, monomethyl terephthalate, monobutyl terephthalate, monodecyl terephthalate, 1,3,5-benzene tricarboxylic acid, 1,2,3,5-benzene tetracarboxylic acid, benzene hexacarboxylic acid, 1,4-naphthalene dicarboxylic acid, 2,6-naphthalene dicarboxylic acid, 2,7-naphthalene dicarboxylic acid and the like.

The orthoesters suitable for use in the invention are a well known group of organic compounds which contain a saturated carbon atom substituted with three or four alkoxy radicals as their functional groups. These compounds are saturated orthoesters of an aliphatic alcohol having from 1 to 8 carbon atoms and an ortho acid selected from the group consisting of orthocarbonic acids and aliphatic orthocarboxylic acids having from 1 to 8 carbon atoms. According to our process, at least one equivalent weight of orthoester is required for each equivalent of carboxylic acid present; that is, an amount of orthoester containing at least one of said alkoxy-substituted saturated carbon atoms is required to be present for each carboxylic acid group in the aromatic carboxylic acid to be esterified. Preferably an excess of the orthoester is present, corresponding to from 3 to 50 equivalents of orthoester per equivalent of aromatic carboxylic acid. Larger amounts of orthoester can be employed but are unnecessary. When the aromatic carboxylic acid employed contains one or more substituents that react with orthoesters, an additional quantity of orthoester corresponding to at least the stoichiometric amount required for reaction with such substituent is added.

Representative orthoesters include monofunctional esters such as tetramethyl orthocarbonate, tetraethyl orthocarbonate, tetrapropyl orthocarbonate, tetraheptyl orthocarbonate, trimethyl orthoformate, triethyl orthoformate, triisopropyl orthoformate, tris(2-chloroethyl) orthoformate, tris(3-methylbutyl) orthoformate, diethylmethyl orthoformate, tricyclohexyl orthoformate, diethylcyclohexyl orthoformate, 3-carbomethoxy orthopropionic acid trimethyl ester, orthocyclohexyl carboxylic acid triethyl ester, monoorthooxalic acid tetraethyl ester, trimethyl orthoacetate, triethyl orthopropionate, trimethyl orthopentanoate, and the like; difunctional esters such as diorthosuccinic acid hexamethyl ester and diorthoadipic acid hexamethyl ester, and the like; and bicyclic orthoesters such as 1-methyl-4-ethyl-2,6,7-trioxabicyclo[2,2,2]-octane and the like.

Alcohols useful in the esterification process are mono- and polyhydric aliphatic alcohols having from 1 to 8 carbon atoms and free of ethylenic unsaturation. They can be substituted by inert substituents including halogen, aryl, alkaryl, and alkoxy groups. Suitable alcohols include methyl alcohol, ethyl alcohol, n-propyl alcohol, isopropyl alcohol, t-butyl alcohol, cyclohexyl alcohol, n-hexyl alcohol, 1,6-dimethyl cyclohexyl alcohol, 1,2,3-trimethylcyclohexyl alcohol, 1,2,3-trimethylpropyl alcohol, ethylene glycol, 2,2'-dihydroxydiethyl ether, phenylethylene glycol, 1,2-propanediol, glycerol, 3-chloro-2-methyl-1,2-propanediol, 3-bromo-2-methyl-1,2-propanediol, 1,4-butanediol, 1,3-butanediol, 2,3-butanediol, 3-methyl-1-butyl alcohol, tolylethylene glycol, and the like. In order to achieve a satisfactory rate of esterification, at least about 5 equivalents of alcohol per equivalent of orthoester are charged. Preferably an excess of from about 7 to about 100 equivalents is added. Still larger amounts of alcohol can be added but are wasteful of the reagent.

The alcohol employed should be substantially free of water and can be distilled or dried over a drying agent prior to use.

The esterification catalysts employed in the process are conventional and are substantially anhydrous strong protonic or Lewis acids. Suitable acids include concentrated (96-100 percent) sulfuric acid, oleum, chlorosulfonic acid, sulfur trioxide, anhydrous hydrogen chloride, boron trifluoride, aluminum trichloride, methane sulfonic acid, methane disulfonic acid, methane trisulfonic acid, o-, m-, and p-toluene sulfonic acid, toluene-2,4-disulfonic acid, benzene sulfonic acid, 1-naphthalene sulfonic acid, 2-naphthalene sulfonic acid, and the like, or mixtures of any of the above. The catalysts should be substantially anhydrous, that is, contain only water of hydration or only small amounts of water, i.e. up to about 5 percent by weight of the catalyst, as may be present in commercially available materials. Since these catalysts are strongly hydrophilic, small amounts of water dissolved in the acid will not be available as free moisture to the reaction mixture.

The proportion of strong acid charged as catalyst will vary depending upon the particular acid employed. As little as about 0.001 equivalent of acid based on the total equivalents of orthoester and alcohol charged to the reaction is effective. Preferably from about 0.007 to about 0.05 equivalent of catalyst per equivalent of orthoester and alcohol are used. Larger amounts of catalyst, particularly more than about 0.1 equivalent per equivalent of orthoester and alcohol charged, can be employed, but are of no advantage and excessive washing of the ester product may be required to remove the excess catalyst.

According to our process, the aromatic carboxylic acid, alcohol, and orthoester are admixed in the desired amounts. The mixture is then heated in the presence of the acid catalyst at moderate temperatures, generally at the reflux temperature of the mixture. Reaction temperatures as low as about 35° C. can be employed but to achieve a desirable rate of reaction, the esterification is carried out at at least about 50° C. If reaction temperatures higher than the normal reflux temperature of the mixture are desired, the mixture can be heated at superatmospheric pressure. The catalyst may be added prior to, during, or after heating the mixture to the desired reaction temperature. The alcohol is retained in the reaction zone by any conventional means, such as a reflux condenser. If desired the reaction can be carried out in an inert atmosphere to prevent oxidation or contamination of the mixture. Heating is continued until the desired degree of esterification is complete. The degree of completion of reaction can be determined by various methods, such as periodic determinations of the aromatic carboxylic acid groups remaining. The process is adaptable to batchwise, semicontinuous, or continuous operation.

The product ester can be recovered in conventional manner, as by cooling the reaction mixture to precipitate the product and separating the ester by filtering, decanting, centrifuging and the like. The mother liquor containing excess alcohol and orthoester can be recycled to esterify a fresh batch of the aromatic carboxylic acid. The ester can also be recovered by adding water to precipitate the product. This method of recovery is less desirable, since the added water may hydrolyze unreacted orthoester. The ester can be washed free of residual acid catalyst with alcohol, preferably alcohol which is saturated with the ester product. The product can be recrystallized if desired in any convenient manner as will be known to one skilled in the art.

The process of the invention can be utilized with excellent results to increase the rate and yield of esters of aromatic carboxylic acids which are difficult to esterify. In addition, partially esterified aromatic carboxylic acids prepared by conventional processes and which contain substantial amounts of carboxylic acid groups can be further esterified rapidly and completely utilizing the present process. The final product has a very high proportion of ester groups and a very low proportion of carboxylic acid groups, if any. The ester products are essentially free of colored by-products and thus are suitable for direct use in commercial applications without the need of further purification. In particular, color-free esters of terephthalic acid can be prepared which are eminently suitable as monomers for the preparation of fiber-forming polyesters of excellent quality.

The following examples will serve to further illustrate the process of this invention, but it is to be understood that the invention is not to be limited to the details disclosed therein.

In the examples all parts and percentages are by weight. The term "acid number" denotes the number of milligrams of potassium hydroxide required to neutralize the acid in one gram of sample.

EXAMPLE 1

25 parts of terephthalic acid having an acid number of 674, 40.6 parts of methyl orthoformate, 166.2 parts of anhydrous methyl alcohol, and 2 parts of p-toluene sulfonic acid monohydrate were charged to a vessel fitted with a reflux condenser. The mixture was heated at reflux while stirring for about one hundred hours. The resultant colorless reaction mixture was cooled to about 55° C. and 500 parts of water were stirred in. The mixture was cooled to room temperature and the white solid product collected by filtration, washed with two 125-part portions of water, and dried at 80° C. for twenty-four hours. 27.9 parts of dimethyl terephthalate were obtained having an acid number of 82.4 and containing 0.041 equivalent of aromatic carboxylic acid. This corresponds to a conversion of 84% of the carboxy groups charged to carbomethoxy groups.

The procedure given above was repeated except that 196 parts of anhydrous methyl alcohol were added and no methyl orthoformate was added.

26.4 parts of dimethyl terephthalate were obtained having an acid number of 108 and containing 0.051 equivalent of aromatic carboxylic acid. This corresponds to a conversion of only 75.7% of the carboxy groups charged to carbomethoxy groups.

These results demonstrate that an improved rate of esterification is obtained utilizing both an alcohol and an orthoester over that obtained utilizing an alcohol alone.

EXAMPLE 2

10 parts of terephthalic acid which had been partially esterified with methyl alcohol having an acid number of 117 and containing 0.02086 equivalent of aromatic carboxylic acid were admixed with 8.91 parts of triethyl orthoformate, 196 parts of anhydrous methyl alcohol, and 3.68 parts of concentrated sulfuric acid and refluxed for two hours. The clear reaction mixture was filtered at 60–65° C. and cooled to about 0° C. in ice to precipitate the product.

The white solid product was slurried with 31.6 parts of anhydrous methyl alcohol, filtered, and washed with an additional 15.8 part portion of the methyl alcohol to remove any residual mineral acid. The product was dried at 80° C. for three hours.

6.9 parts of white crystalline product were obtained having an acid number of 0.77 and containing only $1.37 \times 10^{-5}$ equivalent of aromatic carboxylic acid.

EXAMPLE 3

The procedure given in Example 2 was followed using 12.38 parts of p-toluene sulfonic acid as catalyst. Similar results were obtained.

EXAMPLE 4

The procedure of Example 2 was followed except that the triethyl orthoformate was omitted. After refluxing for two hours the cloudy reaction mixture was filtered. A small amount of aromatic carboxylic acid was isolated from the precipitate.

The solution was cooled to precipitate the product which was filtered off, washed, and dried as in Example 2. 5.3 parts of esterified product were obtained having an acid number of 2.92 and containing $5.22 \times 10^{-5}$ equivalent of aromatic carboxylic acid.

EXAMPLE 5

The procedure of Example 2 was followed omitting both triethyl orthoformate and sulfuric acid catalyst. The reaction mixture was cloudy after refluxing for two hours and was filtered.

3.7 parts of product were obtained having an acid number of 3.17 and containing $5.66 \times 10^{-5}$ equivalent of aromatic carboxylic acid.

EXAMPLE 6

The procedure of Example 2 was followed but omitting the sulfuric acid catalyst. The solution was cloudy after refluxing and was filtered.

Only 2.9 parts of product were isolated. The product had an acid number of 3.67 and contained $6.54 \times 10^{-5}$ equivalent of aromatic carboxylic acid.

EXAMPLE 7

10 parts of terephthalic acid which had been partially esterified with methyl alcohol having an acid number of 17 and containing $3.03 \times 10^{-4}$ equivalent of aromatic carboxylic acid were admixed with 17.8 parts of triethyl orthoformate, 142.6 parts of anhydrous methyl alcohol, and 1.84 parts of concentrated sulfuric acid and the mixture refluxed for two hours. The product was precipitated and washed free of mineral acid as in Example 2.

8.1 parts of white crystalline product were obtained having an acid number of 0.31 and containing $5.53 \times 10^{-6}$ equivalent of aromatic carboxylic acid.

EXAMPLE 8

The procedure given in Example 7 was followed except that only 0.92 part of sulfuric acid was added.

7.5 parts of white crystalline product were obtained having an acid number of 0.64 and containing $1.15 \times 10^{-5}$ equivalent of aromatic carboxylic acid.

EXAMPLE 9

The procedure of Example 7 was followed using 5 parts of partially esterified terephthalic acid, 44.5 parts of triethyl orthoformate, 39.6 parts of anhydrous methyl alcohol, and 1.84 parts of concentrated sulfuric acid, and the mixture refluxed for two hours. The product was isolated and dried as in Example 2.

3.6 parts of white crystalline product were obtained having an acid number of 1.11 and containing $1.98 \times 10^{-5}$ equivalent of aromatic carboxylic acid.

This example demonstrates that the esterification rate decreases when an inadequate excess of alcohol is present.

EXAMPLE 10

The procedure of Example 9 was followed omitting the methyl alcohol and using 89.1 parts of triethyl orthoformate. After refluxing for two hours, the reaction mixture was yellow in color.

2.65 parts of product were obtained having an acid number of 1.16 and containing $2.07 \times 10^{-5}$ equivalent of aromatic carboxylic acid.

This example demonstrates that esterification of an aromatic acid with triethyl orthoformate alone is not effeitive in preventing formation of colored by-products.

EXAMPLE 11

10 parts of terephthalic acid which had been partially esterified with methyl alcohol having an acid number of 16.5 and containing $2.94 \times 10^{-3}$ equivalent of aromatic carboxylic acid, 142.6 parts of anhydrous methyl alcohol, 14.5 parts of trimethyl orthoformate, and 1.84 parts of concentrated sulfuric acid were refluxed for two hours. The resultant colorless reaction mixture was cooled to room temperature and the precipitate collected by filtration. The product was washed free of sulfuric acid with three 15.8 part portions and then three 39.5 part portions of anhydrous methyl alcohol.

7.2 parts of white dimethyl terephthalate were obtained having an acid number of 0.504 and containing $6.48 \times 10^{-5}$ equivalent of aromatic carboxylic acid.

EXAMPLE 12

This example is given to illustrate an esterification utilizing an acetal instead of an orthoester.

10 parts of terephthalic acid which had been partially esterified with methyl alcohol having an acid number of 35 and containing $6.24 \times 10^{-3}$ equivalent of aromatic carboxylic acid, 142.6 parts of anhydrous methyl alcohol, 6.9 parts of acetone dimethyl acetal, and 2.5 parts of p-toluene sulfonic acid monohydrate were admixed and heated at reflux for two hours. The resultant solution was brownish-yellow in color. The product precipitated on cooling and was washed and dried as in Example 2. It had an unsatisfactory yellow color, as did the mother liquor. 7.5 parts of product were obtained having an acid number of 0.76 and containing $1.02 \times 10^{-4}$ equivalent of aromatic carboxylic acid.

It will be apparent that numerous modifications and variations may be effected without departing from the novel concepts of the present invention, and the illustrative details disclosed are not to be construed as imposing undue limitations on the invention.

I claim:

1. An esterification process comprising heating an aromatic carboxylic acid selected from the group consisting of mono- and polycarboxylic acids of the benzene and naphthalene series which can be substituted with groups which are inactive with orthoesters in a mixture containing at least one equivalent of an aliphatic saturated orthoester for each aromatic carboxylic acid equivalent, the orthoester derived from an aliphatic alcohol of 1 to 8 carbon atoms and orthoacids selected from the group consisting of orthocarbonic and aliphatic orthocarboxylic acids of 1 to 8 carbon atoms and at least five equivalents of a saturated mono- or dihydric aliphatic alcohol of 1 to 8 carbon atoms for each equivalent of orthoester present in the presence of a strong acid catalyst and recovering the resultant ester.

2. A process according to claim 1 wherein said aromatic carboxylic acid has a benzene or naphthalene nucleus and in addition to carboxy groups can bear one or more substituents selected from the group consisting of alkyl, alkoxy, aryloxy, carbalkoxy, nitro, halogen, and formyl radicals.

3. A process according to claim 2 wherein said aromatic carboxylic acid is terephthalic acid.

4. A process according to claim 1 wherein said orthoester is methyl orthoformate.

5. A process according to claim 1 wherein said orthoester is triethyl orthoformate.

6. A process according to claim 1 wherein said alcohol is methyl alcohol.

7. A process for esterifying partially esterified alkyl terephthalates without forming colored by-products which comprises heating said partially esterified alkyl terephthalate with a mixture containing at least one equivalent of a saturated aliphatic orthoester of an aliphatic alcohol of 1 to 8 carbon atoms and ortho acids selected from the group consisting of orthocarbonic and aliphatic orthocarboxylic acids of 1 to 8 carbon atoms for each aromatic carboxylic acid equivalent and at least five equivalents of a saturated mono- or dihydric aliphatic alcohol of 1 to 8 carbon atoms for each equivalent of orthoester present in the presence of a strong acid catalyst and recovering the resultant ester.

8. A process according to claim 7 wherein said alkyl terephthalate is premixed with said orthoester and said alcohol prior to heating in the presence of said catalyst.

9. A process according to claim 8 wherein said orthoester is selected from the group consisting of methyl orthoformate and triethyl orthoformate.

10. A process according to claim 7 wherein said alcohol is methyl alcohol.

References Cited
UNITED STATES PATENTS 3,268,482    8/1966    Piirma et al. _____ 260—475 P

OTHER REFERENCES

Cohen et al., Chemistry and Industry, 43, 349 (1965).
Post, J. Org. Chem. 1, pp. 231–235 (1937).

LORRAINE A. WEINBERGER, Primary Examiner

E. J. SKELLY, Assistant Examiner

U.S. Cl. X.R.

260—469, 471 R, 473 R, 475 FR, 475 P, 476 R